July 18, 1967 — C. A. EFF — 3,331,943
VAPORIZING APPARATUS FOR CLEANING DOMESTIC OVEN
Filed Nov. 9, 1964

INVENTOR.
CHRISTIAN A. EFF
BY Richard L. Caslin
HIS ATTORNEY

United States Patent Office 3,331,943
Patented July 18, 1967

3,331,943
VAPORIZING APPARATUS FOR CLEANING
DOMESTIC OVEN
Christian A. Eff, Louisville, Ky., assignor to General
Electric Company, a corporation of New York
Filed Nov. 9, 1964, Ser. No. 409,689
7 Claims. (Cl. 219—398)

ABSTRACT OF THE DISCLOSURE

A cooking apparatus having walls forming an oven cavity, and heating means for supplying heat to the oven for cooking foods placed therein. Combined with the oven is a vaporizer for receiving a solution of ammonia and water. The vaporizer includes a small flash boiler having an electric heating element and a thermal insulating shroud or cup to condense ammonia gas and steam or water vapor on the walls of the oven cavity. The vaporizing cycle is made more efficient by installing a damper in the oven vent system and manipulating the damper to seal the oven cavity during the vaporizing cycle. Another feature is a thermal control circuit to insure that the vaporizer will be rendered inoperative if the oven temperature rises above a critical temperature of about 125° F. There may also be an over-temperature protection means in the control circuit to de-energize the vaporizer heater in the event the supply of fluids in the vaporizer becomes exhausted.

---

The present invention relates to baking ovens and particularly the incorporation of a vaporizing means with the oven to assist in loosening food soil and grease that has become lodged on the walls thereof.

This invention is related to the method invention in the copending application of Stanley B. Welch, Ser. No. 409,688, which is being filed concurrently herewith and is assigned to General Electric Company, the assignee of the present invention. The invention of the subject application relates to a preferred vaporizing apparatus and its control means for loosening the food soil, while the invention in the copending Welch application relates to the method steps that are to be followed in using my vaporizing apparatus.

Probably the major annoyance to the housewife in using an oven is the difficulty encountered in keeping the walls of the oven liner clean. During the normal cooking operations, food particles and grease spatterings often drop on the hot surfaces of the oven liner where they are partially burned so that they not only change color to a dark brown, but what is far more objectionable they adhere tenaciously to the surfaces. Strong cleaning agents have been provided for application to the oven liner walls for the express purpose of removing food soil therefrom, but even the best of these cleaning agents require strong rubbing action, and in any event it is very difficult and a laborious operation to reach all areas of the oven liner.

In the past it has been a long standing practice in many households for the housewife to place a bowl containing household ammonia and hot water within the oven where it is left overnight to evaporate slowly and condense on the cold oven walls. This procedure does not automatically remove the food soil and grease from the oven liner and racks, but it does loosen the soil to a considerable degree. In some cases, depending upon the kind of soil present on the oven walls, it has been unnecessary to scrub or scrape the soil after the use of this ammonia vapor soaking period. However, a hard baked solid coat of grease usually with a dark yellow or brown color will not be penetrated by the ammonia vapors. A black spongy or flaky crust even if it is of heavy thickness and either with of without the presence of grease will float off readily. Also heavy soil adhering to the oven racks is easily removed after an ammonia vapor soaking. Much of the soil that is loosened by the ammonia vapor is of the type that the chemical oven cleaners do not dissolve readily. Hence, the ammonia vapor treatment may be considered as being complementary to the special chemical oven cleaning methods rather than as a substitute.

The principal object of the present invention is to provide a domestic oven with built-in means to facilitate the application of ammonia gas and steam for condenation on the walls thereof for loosening food soil and grease lodged thereon.

A further object of the present invention is to build in a vaporizing unit in conjunction with a domestic oven to increase the speed of reaction between the oven soil and the mixture of solvent and steam.

A further object of the present invention is to provide an oven of the class described with means for sealing the oven during the vaporizing cycle to prevent the flow of air therethrough.

A further object of the present invention is to provide an oven of the class described with temperature sensitive means to insure that the vaporizing unit may not be operated when the oven walls are hot.

A further object of the present invention is to provide an oven of the class described with a vaporizing unit that insures that ammonia gas and steam will be generated simultaneously when using a solution of ammonium hydroxide.

A still further object of the present invention is to provide a temperature cut-off means in conjunction with the vaporizing unit to insure that the unit will be de-enerfiized as soon as its supply of solution of ammonia and water is depleted.

The present invention, in accordance with one form thereof, is embodied in a domestic oven having walls forming an oven cavity where one wall of the cavity includes a door for gaining access thereto. Heating means is provided for supplying heat to the oven for cooking food placed therein. Cooperating with the oven is a vaporizing means for a solution of ammonia and water for loosening food soil and grease that has been baked-on the oven walls. This vaporizing means includes a container with a flash boiler positioned therein. An electric heating element is present in the boiler and a thermal insulating shroud encircles the heating element. This shroud has an inlet opening in its lower portion communicating with the container and an outlet opening communicating with the oven cavity.

Other improvements which may or may not be found necessary depending upon the specific environment in which the invention is practiced are as follows. Means for sealing an oven vent to prevent air flow through the oven during the vaporizing cycle. Control means may be provided to insure that the vent sealing means is operated automatically when the vaporizing unit is energized. Also, a temperature sensitive means is combined with the oven to insure that the vaporizing means cannot be operated when the oven walls are hot or above normal room temperatures. Moreover, a temperature sensitive means may be combined with the vaporizing means to insure that the heating element of the boiler will be de-energized once the supply of solution in the container is depleted so as to prevent an over-heated condition as well as to restrict the waste of energy during inoperative conditions.

My invention will be better understood from the following description taken in conjunction with the accompanying drawing and its scope will be pointed out in the appended claims.

Figures 1, 2:
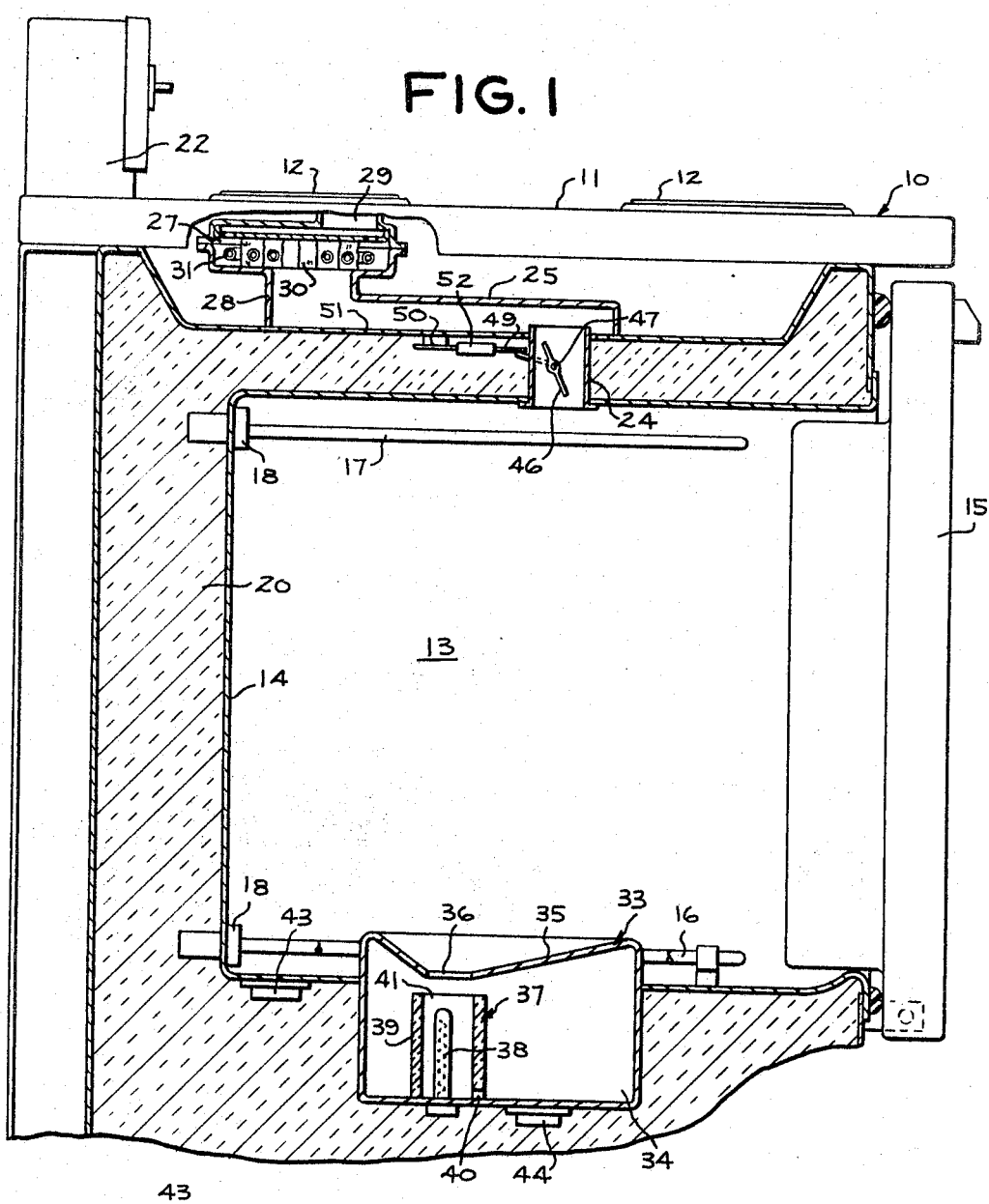
FIGURE 1 is a fragmentary left side elevational view partly in cross-section of an electric range embodying the present invention with a vaporizing unit shown mounted in the bottom wall of the oven liner.
FIGURE 2 is a schematic wiring diagram of the control means for the vaporizing system of the oven for loosening food soil from the walls thereof.

Turning now to a consideration of the drawing, and in particular to FIGURE 1, there is shown for illustrative purposes an electric range 10 having a top cooking surface or cooktop 11 with a plurality of surface heating elements 12, an oven cavity 13 located directly beneath the cooktop 11 and formed by a box-like oven liner 14 cooperating with a front-opening drop door 15. The oven cavity is supplied with two standard heating elements; namely, a lower baking element 16 and an upper broiling element 17. Each oven heating element is of circuitous shape formed by a metal-sheathed resistance heater having terminal ends supported as at 18 in the back wall of the oven liner 14. Suitable thermal insulation such as fiberglass 20 or the like surrounds the oven liner to retain the heat developed by the heating units in the oven cavity for a more efficient utilization of the heating energy as well as to retain the range body at a relatively cool temperature which would not be injurious or uncomfortable to the human touch.

The range is provided along the back edge of the cooktop 11 with a raised backsplash 22 which contains the various circuit control elements, switches, thermostats, clock-timers, thermometers, pilot lights, etc., which would enable the housewife to control the various heating elements of both the cooktop and oven.

The oven cavity 13 is provided with an exhaust or venting system in the top wall of the oven liner 14 in the form of an oven vent 24 of generally cylindrical shape that cooperates with horizontal ducting 25 to carry the oven exhaust beneath the cooktop 11 and out through an opening in the cooktop beneath one of the surface heating elements 12 as is the general practice in this art. A desirable feature to be added to the standard oven venting system is a catalytic oxidation unit 27 which is shown interposed in the ducting 25 between the oven vent 24 and the surface heating element 12 to eliminate the possibility of any smoke, odors, and noxious vapors being returned to the kitchen atmosphere from the oven during a high temperature operation on the order of 600° F. within the oven, which is above the normal cooking temperature range of between about 150° F. and 550° F. A suitable catalytic oxidation unit is disclosed in the U.S. patent of Stanley B. Welch, No. 2,900,483, granted on Aug. 18, 1959, and assigned to General Electric Company, the same assignee as in the present invention. This oxidation unit is a hollow canister having a lower inlet opening 28 and an upper exhaust opening 29. The interior of the canister includes a catalytic platinum surface of wire screen structure 30 and a heating element 31 of circuitous shape interleaved therewith so that the hot oven gases will be catalytically oxidized on the platinum surface that is maintained at a temperature of about 1300° F. by the associated heating element 31.

The present invention is primarily concerned with means for generating a mixture of a gaseous solution and steam within the oven so that the mixture will condense upon the cool walls of the oven liner and inner surface of the door for loosening any and all food soil and grease spatter that has become lodged thereon during normal cooking operation within the oven. A preferred solution is ammonium hydroxide ($NH_4OH$) which when it is vaporized becomes ammonia gas and steam ($NH_3H_2O$), although the more accessible household ammonia, which is a mixture of ammonium hydroxide and suitable detergents, could be used if the pure ammonium hydroxide were not readily available. The vaporizing means is a self-contained unit 33 shown as built into the bottom wall of the oven liner 14 and comprising a metal container 34 with a depressed or funnel-shaped cover 35 having a small inlet and discharge opening 36 at the bottom of the depression for ease in pouring the ammonium hydroxide into the container prior to the operation of the unit. Within the container 34 is a flash boiler 37 comprising a resistance heating element 38 of about 300 watts that is surrounded by a cup-shaped insulating shroud 39. The lower portion of the shroud has a small opening 40 therethrough so that liquids in the container 34 will flow readily between the boiler and the container and maintain the same level. The shroud 39 is of generally cylindrical shape with an open top portion 41 located directly beneath the inlet and discharge opening 36 of the cover member 35. Hence, when the solution is poured through the opening 36 it tends to fill the boiler, although it passes freely from the boiler into container 34 by means of the opening 40 in the lower portion of the shroud. The purpose of this insulating shroud 39 is to thermally insulate the heating element 38 from the bulk of the solvent in the container 34 so that the solution in the container stays relatively cool until it passes into the boiler unit. The reason for this is that the vapor temperature of the ammonium hydroxide is much lower than the boiling point of water, and hence, it is necessary to keep the ammonium hydroxide below this vapor temperature until it reaches the flash boiler 37 where the ammonia gas and steam will be released simultaneously. This has been found to be important because neither the ammonia gas alone nor the condensing steam alone has much effect in loosening the food soil. However, when both the ammonia gas and steam are present at the same time within the oven cavity remarkably successful results can be obtained by the practice of my invention.

The illustration of the vaporizing unit 33 has been exaggerated in scale to best show its construction. Actually, it need be only a small unit for holding about 12 ounces of ammonia solution, while the boiler 37 would have a capacity of about one-half an ounce. Also, an operating cycle of about 30 to 45 minutes duration should vaporize the ammonia solution.

It has been recognized that the temperature of the walls of the oven cavity must be at approximately room temperature so that the mixture of ammonia gas and steam may condense thereon. Otherwise, this vaporizing cycle would be unsuccessful. This objective is insured by providing a normally-closed thermostat 43 in heat transfer relationship with the oven liner 14 and in a series circuit with the heating element 38 of the vaporizing unit so that at temperatures above about 110° F. the switch contacts of the thermostat 43 will be opened to deenergize the heating element 38 of the vaporizing unit.

It is also well to provide an automatic safety cut-off means for the vaporizing unit in the event the supply of liquid solvent has been depleted in the container 34 so as to prevent excessive temperatures as well as to reduce the waste of electricity once the vaporizing means becomes in operative. Such a safety means is provided by a second normally-closed thermostat 44 that is positioned in heat transfer relationship with the container 34 and connected in the power supply circuit in series with the heating element 38 of the boiler of the vaporizing unit as is shown in FIGURE 2. Hence, this thermostat 44 will cycle on and off at a temperature of about 212° F. once the supply of solution in the boiler is exhausted, thereby holding down the maximum temperature of the vaporizing unit within acceptable limits As mentioned previously, the oven cavity 13 is provided with an oven vent 24 in the top wall thereof, and it is considered best to close this vent during the vaporizing cycle so as to increase the efficiency of the cycle, while substantially preventing the escape of ammonia gas into the kitchen which might otherwise render impossible the occupancy of the kitchen because of the high concentration of ammonia. Accordingly, I have chosen to provide an oven vent sealing means in the form of a butterfly damper 46 which is pivotally mounted on a supporting shaft 47 so that during normal cooking operations the damper is in a substantially longitudinal position serving to open the vent as far as possible while during the vaporizing cycle the damper will be moved through an angle of about 90° where it will substantially seal the vent and prevent the flow of air through the oven.

It is well to associate the operation of the damper 46 with the operation of the heating element 38 of the vaporizing unit, so that whenever the heating element 38 is energized the damper will be closed. This objective is obtained by means of a heated bimetallic member 49 that is shown in FIGURE 1 amounted in cantilever fashion by one end 50 that is attached to the insulation guard 51 of the oven. A small heating element 52 is combined with the bimetal 49 to provide a source of heat for the bimetal 49 whenever the heating elements 38 is energized. This heater 52 is connected in series in the power supply circuit for the heating element 38 in a manner similar to the thermostats 43 and 44 as is best seen in the circuit diagram of FIGURE 2. Hence, the danger 46 will have a normal open position, and the combination of the bimetal 49 and heater 52 will serve as an electroresponsive means to actuate the damper into a closed or sealing position in the oven vent 24 whenever the vaporizing cycle is in operation. The circuit of FIGURE 2 also includes an on-off switch 54 which will probably be located in the backsplash 22 of the range along with the other manual circuit control elements. Also, it is well to have a visual indication of the operability of the vaporizing cycle, and this function is provided by a pilot light 55 connected in parallel across the heating element 38 and operable whenever the on-off switch 54 is closed and the temperature of the oven liner is in the vicinity of room temperature as is evidenced by the closed condition of the thermostat 43.

Modifications of this invention will occur to those skilled in this art, therefore, it is to be understood that this invention is not limited to the particular embodiments disclosed, but that it is intended to cover all modifications which are within the true spirit and scope of this invention as claimed.

What I claim as new and desired to secure by Letters Patent of the United States is:

1. A cooking apparatus comprising an outer supporting structure, walls forming an oven cavity, one wall of the cavity including a door for gaining access thereto, heating means for the cavity for supplying the heat for cooking food placed therein, a liquid container combined with the walls of the oven cavity, a thermally insulating cup positioned within the container, an opening in the bottom portion of the cup, an electric heating element within the cup, said container serving to hold a supply of steam and ammonia gas generating material whereby when the said heating element is energized the material will be brought to a boiling temperature and steam and ammonia gas will condense upon the walls of the oven cavity, and a normally-closed temperature sensitive switch in heat transfer relation with the walls of the oven cavity and in series circuit with the said heating element, whereby if the temperature of the walls of the oven cavity are above a critical amount of about 125° F. the switch will be opened to de-energize the heating element.

2. A cooking apparatus as recited in claim 1 with the addition of a second normally-closed temperature sensitive switch in heat transfer relation with the container and in series circuit with the said heating element, whereby if the container becomes empty the said second switch will be opened to de-energize the heating element so as to avoid overheated conditions.

3. A cooking apparatus as recited in claim 1 with the addition of an oven vent, a normally open damper positioned within the vent, and electroresponsive means cooperating with the damper and in series circuit with the said heating element, whereby the damper is adapted to be closed whenever the heating element is energized so as to retain the steam and ammonia gas within the oven cavity.

4. A domestic oven comprising an outer cabinet structure with a box-like oven liner and an access door forming a cooking cavity, heating means for the cavity for supplying heat energy to foods to be cooked therein, a liquid container positioned beneath the oven liner, an opening within the oven liner for filling the container, an insulated cup positioned within the container, an opening in the bottom portion of the cup, an electric heating element within the cup to serve as a flash heating means, the contianer being supplied with a quantity of ammonium hydroxide, a vent opening combined with the oven liner, a normally open damper positioned within the vent opening, and electroresponsive means cooperating with the damper and in series circuit with the said heating element, whereby the damper is adapted to be closed whenever the heating element is energized.

5. A domestic oven comprising walls forming an oven cavity, one wall of the cavity including a door for gaining access thereto, heating means supplied with the cavity for cooking food placed therein, vaporizing means for loosening food soil and grease that has been baked on the said walls, said vaporizing means comprising a generally closed container, a flash boiler combined with the container, said boiler including an electric heating element and a thermal insulating shroud closley encircling the heating element, the shroud having an inlet opening in its lower portion communicating with the container and an outlet opening communicating with the oven cavity, and an oven vent in a wall of the oven cavity, automatic sealing means for closing the oven vent during the operation of the said vaporizing means, said sealing means comprising a normally open damper and an electro-responsive closing means operably connected to the damper, a power supply circuit for the electric heating element of the said flash boiler, the electro-responsive means being connected in the power supply circuit in series with the said heating element and operate concurrently therewith.

6. A domestic oven as recited in claim 5 with the addition of a normally-closed thermostatic switch in heat transfer relation with the oven cavity, the said switch being connected in the power supply circuit and arranged to be open-circuited at a temperature of about 125° F., so that the vaporizing means can only be operated when the walls of the oven cavity are relatively cool.

7. A domestic oven as recited in claim 6 with the addition of a second normally-closed thermostatic switch in heat transfer relation with the vaporizing means, this second switch being connected in series in the power supply circuit and arranged to be opened-circuited at a predetermined cut-off temperature during the operation of the vaporizing means once the boiler becomes empty.

References Cited

UNITED STATES PATENTS

| 1,346,353 | 7/1920 | Ullman et al. | 219—271 |
| 1,516,203 | 11/1924 | Oakley | 219—399 |
| 3,079,284 | 2/1963 | Boucher | 134—4 |
| 3,196,046 | 7/1965 | Brite | 134—11 X |
| 3,219,795 | 11/1965 | Wiseman | 219—271 X |

RICHARD M. WOOD, Primary Examiner.

C. L. ALBRITTON, Assistant Examiner.